United States Patent [19]

Purser

[11] Patent Number: 5,237,174
[45] Date of Patent: Aug. 17, 1993

[54] SINGLE ATOM DETECTION OF CHCORINE-36 BY TRIPLE-STAGE ACCELERATOR MASS SPECTROMETRY

[75] Inventor: Kenneth H. Purser, Lexington, Mass.

[73] Assignee: High Voltage Engineering Europa, Amersfoort, Netherlands

[21] Appl. No.: 774,078

[22] Filed: Oct. 9, 1991

[51] Int. Cl.⁵ .............................................. H01J 49/26
[52] U.S. Cl. .................... 250/281; 250/282; 250/296
[58] Field of Search ........... 250/281, 282, 296, 288 R, 250/294, 296, 297, 298, 259; 436/173

[56] References Cited

U.S. PATENT DOCUMENTS

| | | | |
|---|---|---|---|
| 4,588,889 | 5/1986 | Naito | 250/295 |
| 4,973,841 | 11/1990 | Purser | 250/282 |
| 5,049,739 | 9/1991 | Okamoto | 250/281 |

*Primary Examiner*—Jack I. Berman
*Assistant Examiner*—James Beyer
*Attorney, Agent, or Firm*—Nields & Lemack

[57] ABSTRACT

The capability of an existing AMS system is expanded to provide capability for identification of $^{36}$Cl atoms to the exclusion of $^{36}$S atoms by adding to such a system a booster accelerator having an ionization detector in its high-voltage terminal capable of measuring dE/dx as a function of penetration depth. The voltage of the direct-voltage accelerators employed need not exceed voltages of the order of 3 million volts, even though the ions detected have energies in excess of 36 million electron volts.

5 Claims, 4 Drawing Sheets

SINGLE ATOM DETECTION OF CHCORINE-36 BY TRIPLE-STAGE ACCELERATOR MASS SPECTROMETRY

BACKGROUND OF THE INVENTION

1. Field of the Invention

This invention relates to accelerator mass spectrometry (AMS), wherein negative ions are formed from a sample to be analyzed and are accelerated in a tandem accelerator to a high-voltage terminal maintained at a high positive potential. A stripper within the high-voltage terminal converts the negative ions to a positive charge state and induces dissociation of all background molecules. After further acceleration and mass analysis, the particles to be analyzed are detected and their properties meausured.

2. Description of the Prior Art

During the pass twelve years, detection efficiency for long-lived isotopes has been dramatically improved by applying the techniques of Accelerator Mass Spectrometry (AMS). Using AMS, the presence of a radioactive nucleus is detected, not by waiting for it to make a radioactive transformation, but rather by searching for the unstable atoms themselves. The basic principles of AMS instrumentation have been described by Kenneth H. Purser in U.S. Pat. No. 4,037,100; by Kenneth H. Purser, R. B. Liebert and C. J. Russo in Radiocarbon 22, (1980) 794; and by Kenneth H. Purser, A. E. Litherland and H. E. Gove in Nuclear Instruments and Methods 162, 637 (1979). A recent review of AMS measurements, as applied to long-lived isotopes, has been provided by D. Elmore and F. M. Phillips in Science 236, 543 (1987).

Background to Accelerator Mass Spectrometry as Applied to Long-Lived Radioisotopes The conventional technique for estimating the number of radioactive atoms in a sample depends upon a measurement of the nuclear decay rate. This rate, in conjunction with a knowledge of the half-life, allows a calculation of the number of nuclei in the sample. By its nature the technique is such that the experimenter must wait until individual atoms decay; an inefficient process which becomes even more inefficient with increasing half life.

A good example which illustrates the poor efficiency of the conventional technique in comparison to AMS can be seen in $^{14}C$ detection. Conventionally, the number of nuclei present in a sample has been measured by counting the particles emitted during the decay of the $^{14}C$ atoms present in the sample. In contrast, with AMS techniques, radioactivity has no relevance to the detection method and instead the number of $^{14}C$ atoms present in the sample is directly counted nucleus by nucleus. The advantages of this procedure are manifold: Compared to conventional $^{14}C$ dating, measurement time is reduced from weeks to 1-2 hours; the necessary sample size is reduced by a factor of a thousand or more; in favorable cases the range of age measurements can be extended from ~30,000 years (in an average C-14 laboratory) to >60,000 years.

While $^{14}C$ measurements provide a good example of the advantages of AMS procedures, the technique is not limited to this isotope but can also usefully be applied to a number of other long-lived radioactive nuclei including $^{3}H$, $^{10}Be$, $^{26}Al$, $^{36}Cl$, $^{41}Ca$, $^{129}I$. With the exception of tritium, the half lives of these isotopes are much longer than $^{14}C$ and the advantages of AMS listed in the previous paragraph become even more pronounced.

Chlorine-36 Measurements

One of these, the chlorine isotope $^{36}Cl$, has important uses in geology, hydrology and environmental studies. Its half life of $3.01.10^5$ years is comparable to the residence time of water in many aquifers and because of chlorine's hydrophilic properties, it is well-suited as a tracer for hydrological processes. (See Purdy, C. B. et al.. "36Cl: A tracer in groundwater in the aquia formation of Southern Maryland". Nuclear Instruments and Methods B29, 372, (1987)). For example, during studies of water residence in the Australian Great Artesian Basic, the decay of $^{36}Cl$ has been used to identify flow paths. (See Bentley, H. W. et al. Water Resources 22, 1991, (1986)).

The fundamental problem of detecting $^{36}Cl$ using the AMS procedures described in the aforementioned article by Purdy, C. B. et al. is that, although chlorine can readily exist as a negative ion, and can therefore be detected using a tandem AMS system, nature also provides a stable isobar, $^{36}S$, which can exist as a stable negative ion. Thus, any sulphur contamination in the sample produces a background of isobaric ions in the final detector which cannot be removed by any combination of electric and magnetic fields. In practice, this background can be a formidable handicap to $^{36}Cl$ measurements.

Because $^{36}S$ has only a 0.014% natural isotope abundance ratio, it might be anticipated that backgrounds from this species could be made small if clean chemical procedures were used during target preparation. However, in practice, sulphur is a very widely distributed element and AMS is so exquisitely sensitive that experimentally it has been found to be impossible to eliminate $^{36}S$ contamination at the $^{36}Cl$ concentrations found in some underground aquifers ($1:10^{14}$ or less). To achieve adequate $^{36}S$—$^{36}Cl$ separation, it has been found necessary to take great care during chemical preparation and also to accelerate the ions to energies of at least 30 MeV before they are directed into an ionization detector.

To achieve final ion energies of more than 30 MeV, using a simple tandem AMS system, requires the use of a rather large nuclear physics type tandem accelerator having a terminal voltages ranging between 6–10 MV. Such machines are physically large (See Kubik, P. W. et al. "Accelerator Mass Spectrometry at the University of Rochester" Nuclear Instruments and Methods B29, 138, (1978)), are usually found only at major nuclear facilities, they are expensive to operate, and require the services of a professional staff of operators. In addition, such facilities are almost always engaged in a number of nuclear programs which compete for accelerator time, thus, limiting the number of $^{36}Cl$ samples which can be measured and the rapidity with which data can be collected. A number of small laboratories have shown considerable interest in having their own facilities for making $^{36}Cl$ measurements.

SUMMARY OF THE INVENTION

The present invention comprehends equipment which can be added to a conventional $^{14}C$ AMS dating system (See Purser, K. H., Smick, T. H. and Purser, R. K. "A Precision $^{14}C$ Accelerator Mass Spectrometer" Nuclear Instruments and Methods B52, 263, (1990) to extend its capabilities for the detection of $^{36}Cl$. The equipment is expected to be of a size and price that make it suitable for installation within a conventionally-sized geophysical laboratory.

BRIEF DESCRIPTION OF THE DRAWINGS

The invention may best be understood from the following detailed description thereof, having reference to the accompanying drawings, in which.

DESCRIPTION OF THE PREFERRED EMBODIMENT

Present Invention

Figure 1:
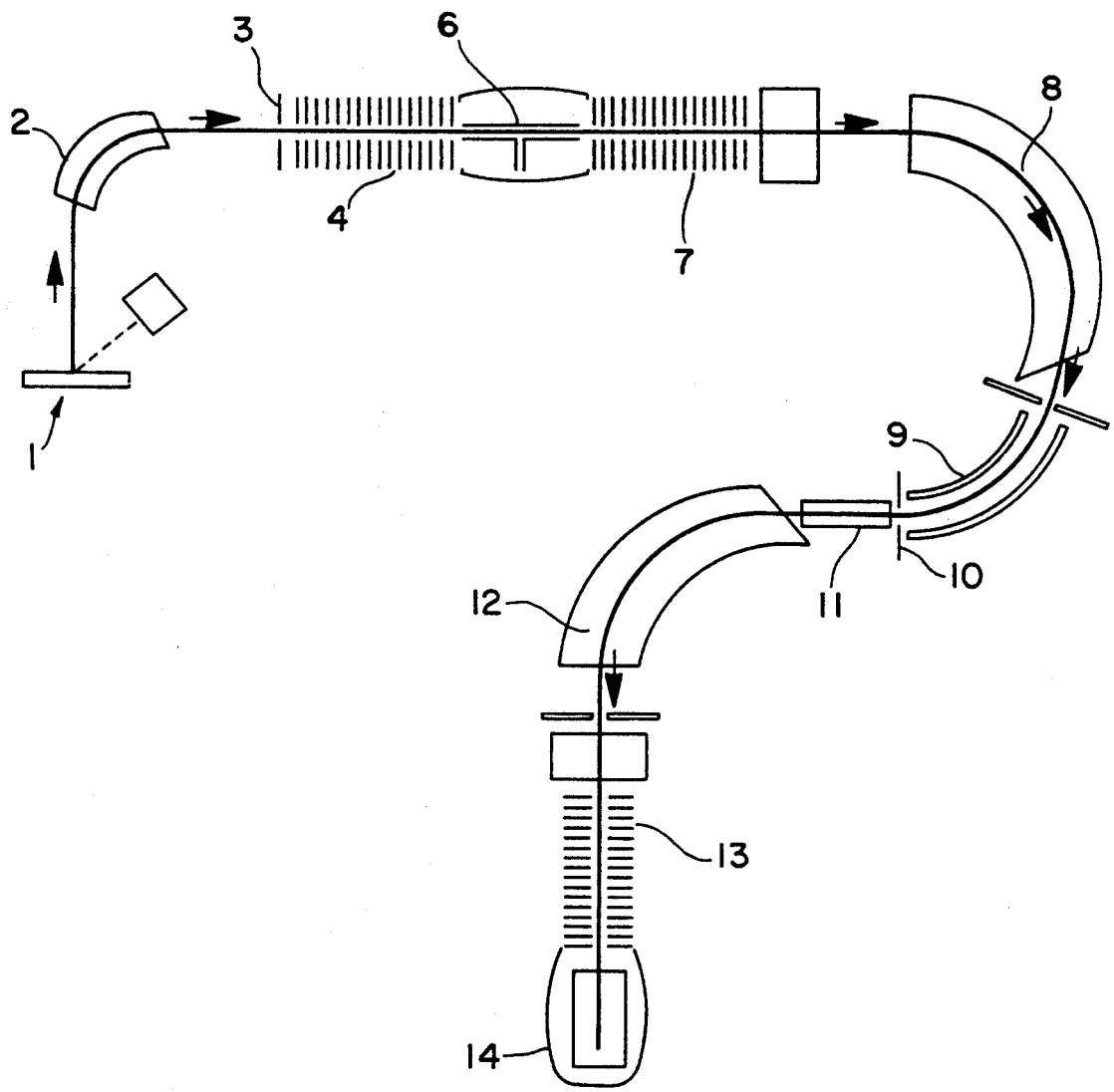
FIG. 1 is a block diagram showing the elements of the present invention.

A block diagram showing the elements of the present invention is shown in FIG. 1. Basically, the instrument consists of an accelerator mass spectrometer system similar to that described in the aforementioned article by Purser, K. H., Smick, T. H. and Purser, R. K., with additional equipment added beyond the high energy mass analyzer to provide the extra acceleration to 35 MeV essential for $^{36}Cl$ measurements.

Negative chlorine ions from a suitable ion source 1 are mass analyzed in a mass analyzer 2, so that only mass-36 particles pass through the selection aperture (or mass defining aperture) 3. While many types of ion source are suitable for the generation of Cl− ions, and are well known to those skilled in the art, a sputter source based on the prior art of Middleton (See Middleton, R. "Negative Ion Sources" Nuclear Instruments and Methods, 122, 35–43, (1974)) is the preferred embodiment.

Following mass analysis, the selected negative ions are directed into the first tandem acceleration stage 4, where they are accelerated to an energy of 3 MeV and directed into a gas dissociation canal 6. At an energy of 3.0 MeV, approximately 25% of the ions leaving the gas dissociation canal (or windowless gas cell) 6 will have had five electrons removed from the negative chlorine ions (See Wittkower, A. B., and Ryding, G. "Equilibrium Charge-State Distributions of Heavy Ions (1–14 MeV) Physical Review A, 4, 226 (1971)) and leave the cell in a 4+ charge state. These ions are directed into the second acceleration region 7 where, at a terminal potential of 3 MV, they receive a further energy increment of 12 MeV to leave the tandem with a total kinetic energy of 15 MeV. Tandem accelerators are described for example, in U.S. Pat. No. 3,423,684 to Kenneth H. Purser, wherein the uniform nature of the electric field within the accelerator tube is described at column 2 lines 13-18. Related disclosures are set forth in, e.g. U.S. Pat. No. 4,973,841 to Kenneth H. Purser and U.S. Pat. No. 5,013,923 to Litherland and Kilius, as well as in the aforementioned U.S. Pat. No. 4,037,100, which discloses the return of "fragments" to "ground potential" at column 4 lines 15-24.

The Second Mass Spectrometer

In the preferred embodiment, the ions which leave the tandem are mass analyzed using a trio of magnetic-electric-magnetic elements. However, it will be clear to those skilled in the art that there are many possible combinations of electric and magnetic elements which will accomplish the needed mass analysis.

Referring to FIG. 1, it can be seen that the first element of this is a magnetic deflection of 100° in a first magnetic deflector 8 which provides the initial separation of wanted mass-36 particles from unwanted background ions. The most significant class of backgrounds which can pass this magnetic filter unimpeded are $^{35}Cl^{4+}$ and $^{37}Cl^{4+}$ ions which have charge changed within the acceleration region and end up with the same magnetic rigidity as 15 MeV $^{36}Cl^{4+}$. For the $^{35}Cl^{4+}$ backgrounds the most intense contribution arises from particles which leave the high voltage terminal in a 5+ charge state and subsequently charge exchange downwards within the electrostatic acceleration fields to 4+. For $^{37}Cl^{4+}$ the situation is reversed, 3+ ions leaving the terminal charge exchange upwards within the electrostatic acceleration Fields to 4+. A consequence of these processes is the generation of a continuous spectrum of ions a small fraction of which can pass through the defining aperture following the 100° magnetic deflection.

An electrostatic deflection in an electrostatic deflector 9 following the 110° magnetic deflection provides an almost impenetrable barrier for the $ME/q^2$ ambiguities described in the previous paragraph. The wanted mass-36 ions leaving the electrostatic deflector 9 pass through a defining aperture 10. Immediately following this aperture 10 is a second charge changing region which can be a gas cell 11 or a foil stripper where approximately 35% of the selected $^{36}Cl^{4+}$ are charged changed in a gas into $^{36}S^{7+}$, are further analyzed by a magnetic deflection in a second magnetic deflector 12 from whence they are directed into a final d.c. energy booster (13).

Booster Accelerator

Up to this point, with the exception of the second charge exchange, the geometry of the system is identical to that of a conventional $^{14}C$ AMS system with the 4+ ions being mass analyzed at 15 MeV. The novel feature of the present invention is that the additional energy boost needed for $\Delta Z/Z$ dispersion is achieved by accelerating the particles a third time to an isolated high voltage terminal 14 maintained at a potential of approximately 3 million volts negative. Said high voltage terminal 14 is connected to ground potential via a vacuum enclosure consisting of a number of plane electrodes normal to be the beam direction with suitable apertures for the passage of the ions, as shown in FIG. 1. Because the ions have a charge state of 7+, the additional energy gained in this stage is 21 MeV leading to a final energy for the $^{36}Cl$ ions of 36 MeV.

Because of the high ionic charge state used during booster operation, the power supply for the booster need only operate at a maximum negative potential between 3–4 MV. This voltage, which is comparatively small in the world of electrostatic accelerators, allows the use of a small sized instrument which can be made to operate very reliably and with little maintenance. The power supply needs to produce currents only of order a few microamperes and so requires little power and can be stabilized using a generating voltmeter or a resistor divider. In the preferred embodiment, it is anticipated that a parallel-fed Cockroft Walton high voltage power supply would be used for high reliability. However, those skilled in the art of D.C. power supply design will recognize that other types of power supply, such as a Van de Graaff generator or a Pelletron generator could be equally well employed as a voltage source.

Background additions

It is important that backgrounds not be introduced by secondary particles which originate from within the booster acceleration tube 13. To avoid this effect, it may be necessary to incline the acceleration fields so that they are at an angle to the tube axis. The inclined fields would be similar to those described by Van de Graaff. (See Van de Graaff, R. J., Rose, P. H., and Wittkower, A. B. Nature 195, 1293, 1962)). Additionally, in the terminal, a small magnetic deflection may be desirable to deflect any unwanted charged ions away and prevent them from entering the detector.

Final Detector

The energy loss measurements needed to separate $^{36}Cl$ from $^{36}S$ events at adequate resolution to provide adequate separation is accomplished using a gas ionization detector located in the terminal 14 of the booster 14. The construction would be similar to the counter shown in FIG. 2, which is more fully described in the aforementioned article by Kenneth H. Purser, A. E. Litherland and H. E. Gove.

Particle Identification

As described in an earlier paragraph, the key problem for AMS detection of $^{36}Cl$ is discriminating against the ubiquitous $^{36}S$ impurities. This involves differentiating between particles having almost identical mass but differing by one in atomic number; a task that is almost impossible with conventional mass spectrometry. However, using the energies available using AMS techniques, discrimination between particles of different Z is possible by measuring the energy loss per unit path length. This loss depends upon the well known Bethe-Block relationship for the energy loss of charged particles in matter. (See Livingston, M. S. and Bethe, H. A. Rev. Mod Phys. 9. 237. (1937)).

$$dE/dx \alpha Z^2/v^2 \quad (1)$$

where, dE/dx is the energy loss per unit length of the path as the ion slows down, v is the velocity, and Z is the atomic number of the particle.

For heavier particles that are moving at velocities corresponding to energies of about 1 MeV/AMU the electrons will not be completely stripped from the ions and the energy loss depends upon the r.m.s. charge state of the ions, $q_{eff}$, rather than on the atomic number, Z. To a first approximation $q_{eff}$ is proportional to $Z\alpha$ where $\alpha \sim 0.5$. (See Wittkower, A. B., and Ryding, G. "Equilibrium Charge-State distributions of Heavy Ions (1-14 Mev) Physical Review A, 4, 226 (1971)).

Figure 2:
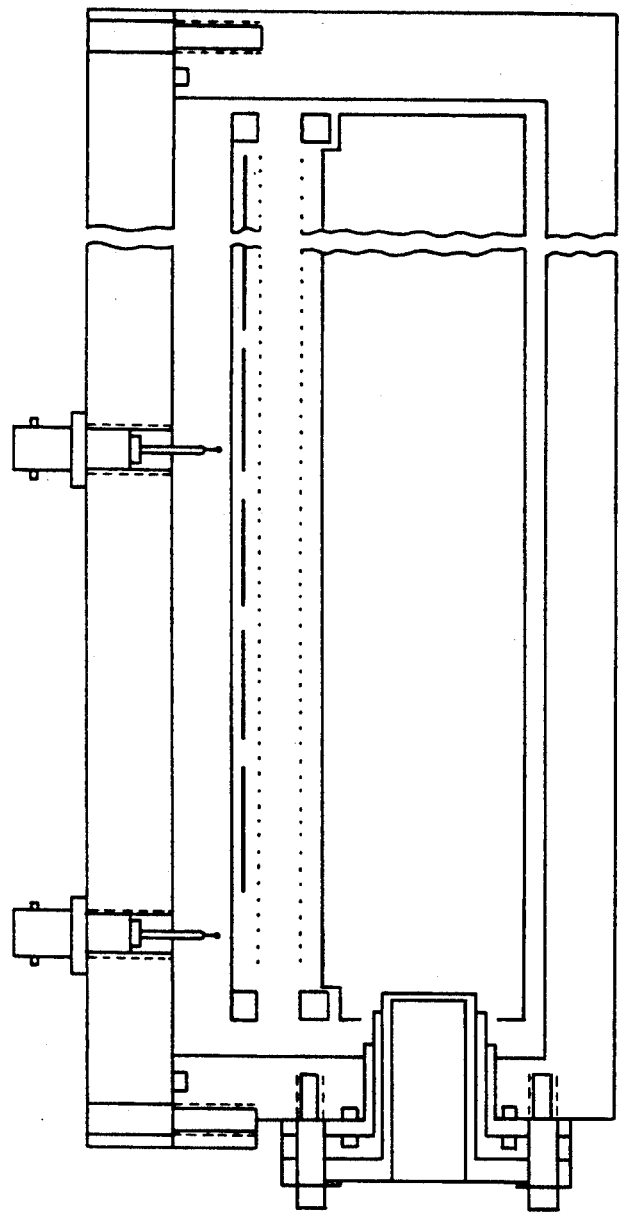
FIG. 2 is a somewhat schematic sectional view of an ionization detector suitable for use in the invention.
Figure 3:
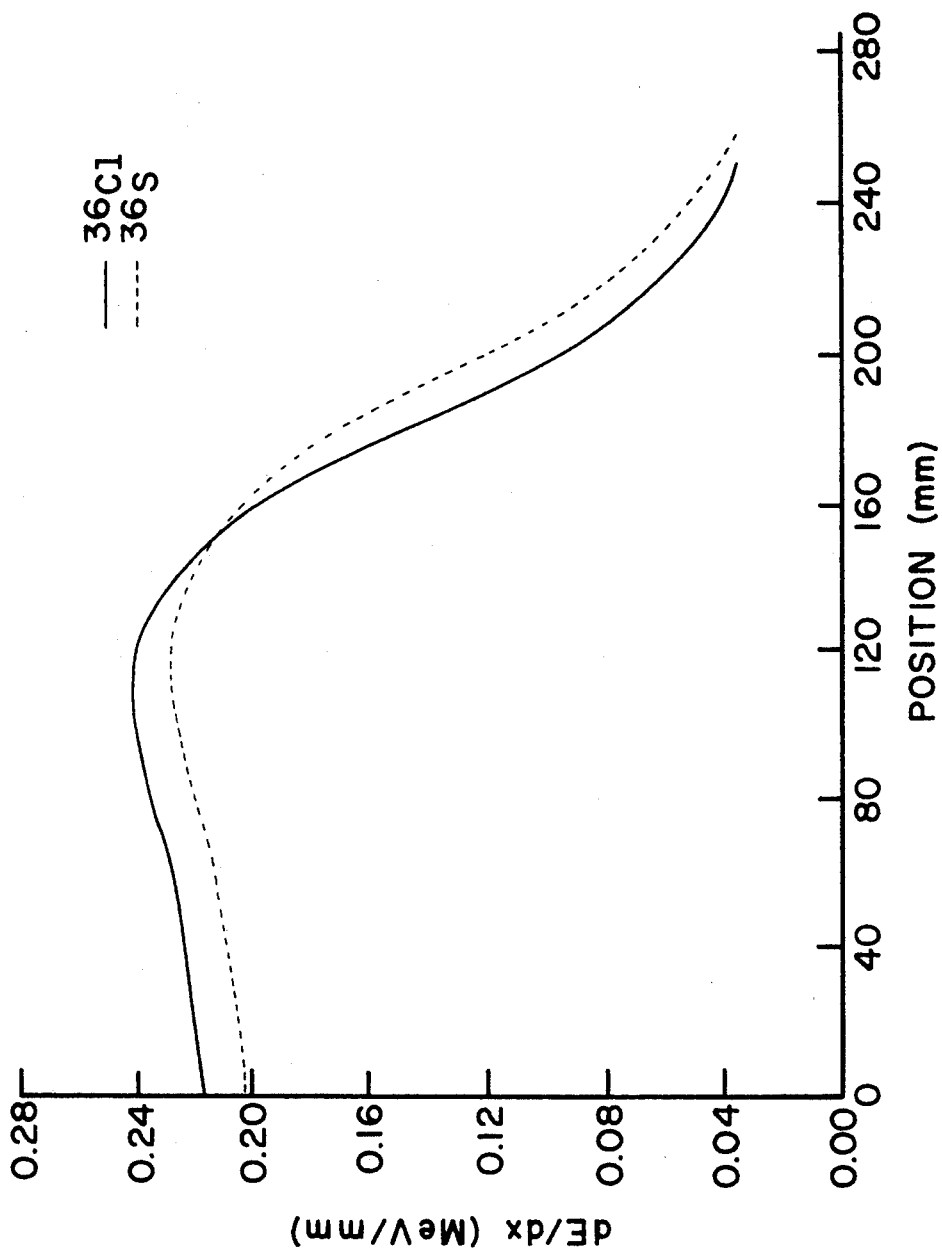
FIG. 3 is a graph showing the rate of energy loss for both $^{36}Cl$ and $^{36}S$ ions in a gas counter as a function of penetration depth.
Figure 4:
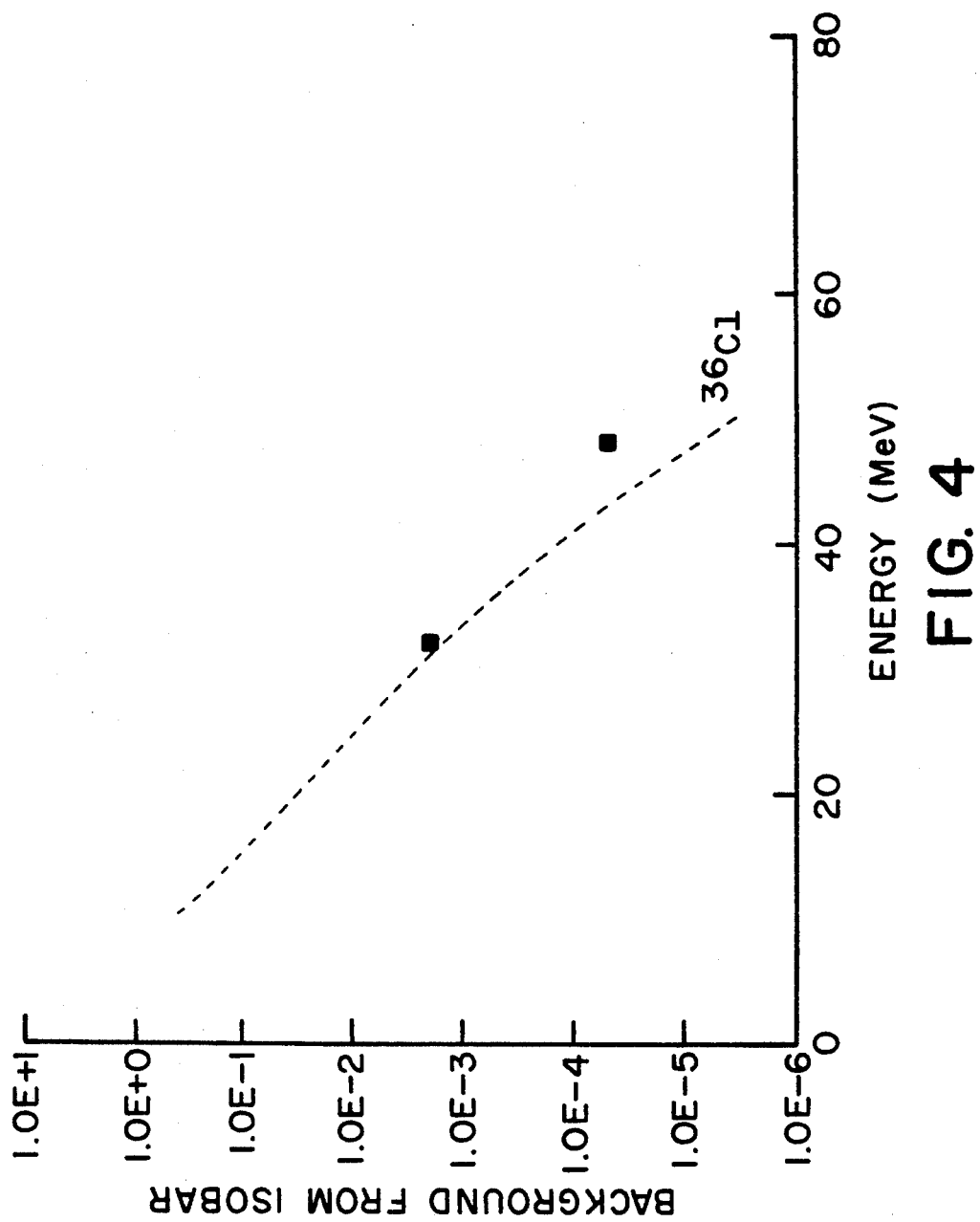
FIG. 4 is a graph showing isobar suppression for various radioisotopes as a function of the beam energy for a split-anode detector.

FIG. 2 shows schematically a detector which can take advantage of the dE/dx differences from element to element implicit in equation 1 whose elemental resolving power, $\Delta Z/Z$, can be calculated from stopping power data. (See Ziegler, J. F., Biersack J., and Littmark, U. *The Stopping and Range of Ions in Solids*. (Pergamon, N.Y. 1985)). FIG. 3, taken from the work of Suter (See Suter, M. "Accelerator Mass Spectrometry: State of the Art in 1990" Nuclear Instruments and Methods, B52, 221, (1990)), shows a calculation for such a detector of the rate of energy loss for both $^{36}Cl$ and $^{36}S$. It can easily be seen that the maximum discrimination between these two elements can be achieved when the collection electrode extends up to the crossing point of the two curves. FIG. 4, also taken from the work of Suter and his colleagues (See Synal, H. A. et al. Nuclear Instruments and Methods, B29. 146, (1987)), shows the isobar suppression for $^{36}S$ during $^{36}Cl$ measurements as a function of the incident energy; two experimental data points are included which confirm that at 35 MeV, the unwanted isobar suppression factor is approximately 1000.

It should be emphasized that at 10 or 15 MeV, the maximum energy available from the commercial $^{14}C$ AMS systems described in the aforementioned reference by Purser, K. H., Smick, T. H. and Purser, R. K. is quite inadequate for $^{36}Cl$ detection at hydrological levels; higher energies are essential.

Referring now to FIG. 1 in conjunction with FIG. 2, the combined beam of $^{36}Cl$ and $^{36}S$ ions enters through a thin metallized mylar window which can be quite small in size; at the entrance to the detector, the particle envelope will be less than 3 mm by 3 mm. The particles stop in the gas producing electrons that are rapidly swept out of the active volume towards collector electrodes. The number of free electrons produced is proportional to the dE/dx losses as the particles slow down, so that it is possible to choose the gas pressure and the region for collecting individual events so that the resolution is optimized.

Clearly the individual dE/dx signals from each of the collector plates must be digitized with respect to the collected charge for each event and the data returned to ground for further processing. Although rates of the order 1000/second are anticipated for each channel, handling data at this rate is not a problem for those skilled in the art.

I claim:

1. An ultra-sensitive molecular spectrometer for heavy isotopes (including but not limited to chlorine-36) comprising in combination:

a sample holder comprising the sample to be measured mounted on a suitable mechanical support, means for producing a beam of negative ions from said sample, a mass analyzer for selecting ions of a specific mass from the said beam of negative ions, means for accelerating said selected ions to energies of order several MeV comprising a substantially constant electric field, means for removing electrons from the said specific mass ions including a gas cell or foil stripper first target to remove electrons from the negative ions and produce ions with a positive charge and means for directing said ions through said first target so that fragments emerge therefrom, a second stage of acceleration for said positively charged ions comprising a substantially constant electric field whereby said fragments acquire additional kinetic energy and are returned to ground potential, means for dispersing said positively charged ions following the said second stage of acceleration whereby ions of the wanted mass and charge are selected and unwanted masses rejected, means for further removing electrons from the said specific mass ions including a gas cell or foil stripper second target to produce particles having further enhanced positive charge and means for directing said ions through said second target, means for providing a third stage of acceleration for said enhanced positively charged ions comprising a substantially constant electric field whereby said fragments acquire an additional kinetic energy, and a field free region which incorporates a suitable ion detector which measures the final energy of the ions and the rate of energy loss of each enhanced positively charged ion.

2. The apparatus of claim 1 wherein the third stage of acceleration consists of a negative polarity high voltage terminal connected to ground potential via a vacuum enclosure consisting of a number of plane electrodes normal to the beam direction with suitable apertures for the passage of the ions.

3. The apparatus of claim 2 wherein the vacuum enclosure also includes a number of plane electrodes that are not normal to the beam direction.

4. The apparatus of claim 2 wherein the high voltage terminal operates at a potential between 3 and 4 million volts.

5. The apparatus of claim 1 wherein the ion detector in the said field free region is a gaseous ion chamber.

* * * * *